March 31, 1936. R. C. PIERCE 2,035,758
FILTER
Filed May 6, 1935
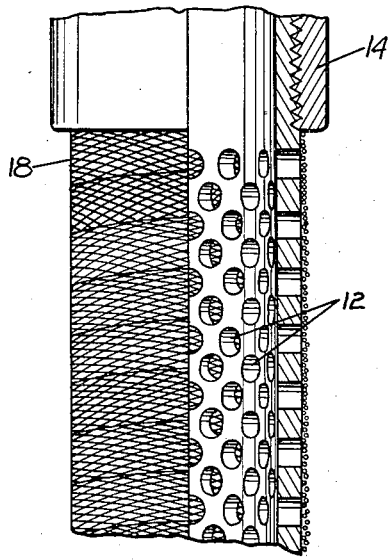
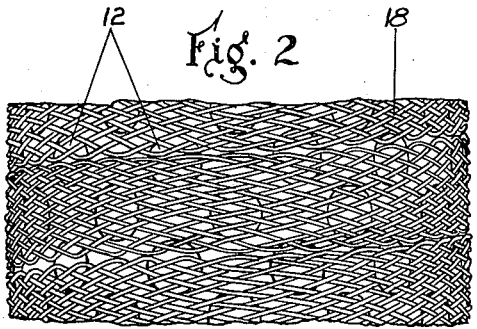
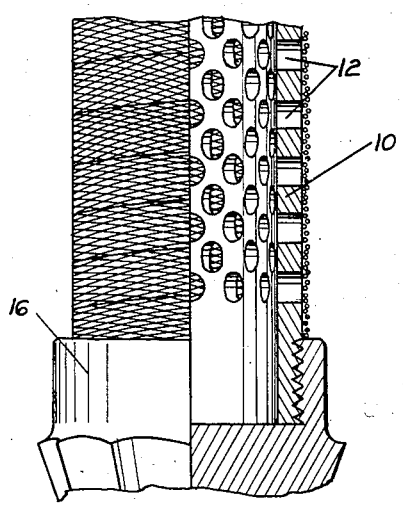
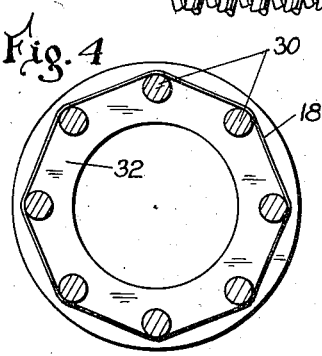
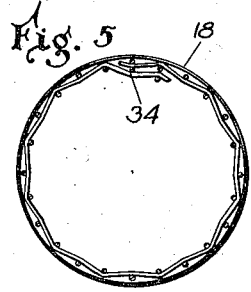
INVENTOR.
ROBERT C. PIERCE
BY
McConkey & Booth
ATTORNEY.

Patented Mar. 31, 1936

2,035,758

UNITED STATES PATENT OFFICE 2,035,758

FILTER

Robert C. Pierce, Niles, Mich., assignor to National Standard Company, Niles, Mich., a corporation of Michigan Application May 6, 1935, Serial No. 20,014

1 Claim. (Cl. 210—169)

This invention relates to filters, and more especially heavy-duty filters which must stand rough usage or which must filter liquids under high pressure.

The sturdy character of my novel filter depends in part on utilizing for the body of the filter a generally tubular base formed with relatively large openings, such as perforated metal conduit or a cage of heavy supporting wires or rods, or a cylindrical structure formed of heavy coarse-mesh screen, or the like. Upon this is wound helically, preferably under considerable tension, a braid of strong wire.

The wires in a braid of this character extend from one end of the braid to the other, so that tension applied to the ends of the braid will act on all of the wires which form it. I prefer to secure the ends of the braid to the conduit, with the braid under tension, thus greatly strengthening the conduit as well as providing a filtering medium capable of withstanding very high pressures.

In most cases the braid is wound with adjacent convolutions in edge-to-edge engagement, so that the entire surface of the perforated part of the conduit is covered.

A construction such as described above is not only very strong, but also permits the use of strong and fairly heavy braid wires, as it is the width of the diamond-shaped interstices between the wires which determines the effective size of the passages which act as the actual filtering medium.

The above and other objects and features of the invention, including various novel combinations of parts and desirable particular constructions, will be apparent from the following description of the illustrative embodiment shown in the accompanying drawing, in which:

Figure 1 is a side elevation of a section of perforated heavy pipe made up according to my invention as a filter, and broken away on the right in longitudinal section;

Figure 2 is a partial elevation on a larger scale, showing the manner in which the interstices of the braid form a filtering medium over the openings in the pipe;

Figure 3 is a plan view on a still larger scale of a section of braid.

Figure 4 is a section of a modification in which the body of the filter is a heavy structure built up of parallel heavy wires or rods; and Figure 5 is a similar section through a modification in which the body is formed by rolling up heavy coarse-mesh screen cloth.

The body of my novel filter consists of a heavy and strong support formed with relatively large openings, such as a perforated conduit shown in Figure 1 as a section 10 of strong and heavy pipe formed with openings 12 therethrough. The illustrated section of pipe has an attaching fitting 14 at its upper end and an imperforate closure 16 threaded on its lower end.

Wound helically on this conduit, with adjacent convolutions in edge-to-edge engagement, is a braid 18 of strong wire, of steel or brass or copper or other metal. This braid is secured at its ends, by welding or soldering or other means, to the pipe 10, with the braid under substantial tension, but is free from positive connection to the pipe between its ends. It will be appreciated that the greater the tension on the braid, the smaller the effective size of the interstices through the braid.

Since all of the wires in the braid extend the full length of the braid, they are all secured at their ends, and a very heavy tension can safely be imposed on the braid on account of the great combined tensile strength of the various wires. This enables the filter to resist high pressures, but with a resilient action. The great strength of the braid also highly reinforces the pipe 10 against pressures, both internal and external but especially the former, and protects it in case of rough usage.

In the modification of Figure 4, the braid 18 is wound over a body comprising heavy parallel wires or rods 30, fixed at their ends as an annular series in suitable rigid heads 32. In Figure 5, the body comprises a cylindrical roll 34 of heavy coarse-mesh screen or hardware cloth.

While illustrative embodiments have been described in detail, it is not my intention to limit the scope of the invention to those particular embodiments, or otherwise than by the terms of the appended claim.

I claim:

A filter comprising a generally tubular heavy supporting body formed with relatively large openings and having helically wound thereon under tension a wire braid consisting of a considerable number of wires extending from one end of the braid to the other and with each wire passing alternately over and under the other wires to form a relatively wide tape having elongated apertures between the adjacent wires, and which braid is arranged with adjacent convolutions in edge-to-edge engagement so that the braid covers the entire surface of the perforated portion of the supporting body.

ROBERT C. PIERCE.